May 27, 1941. L. H. KYLE 2,243,280
HYDRAULIC SHOCK ABSORBER
Filed April 9, 1940
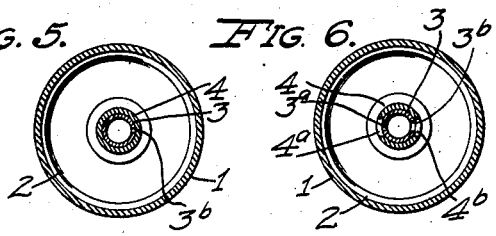
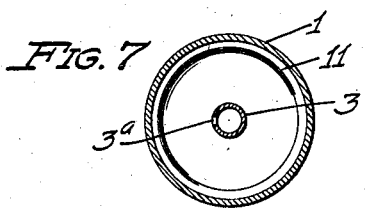
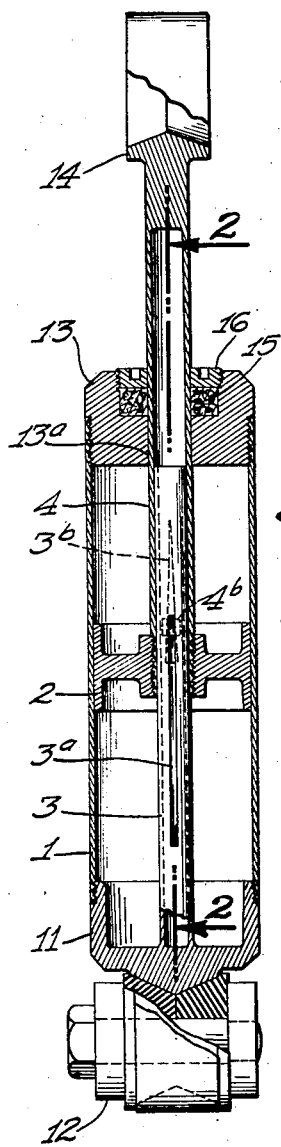
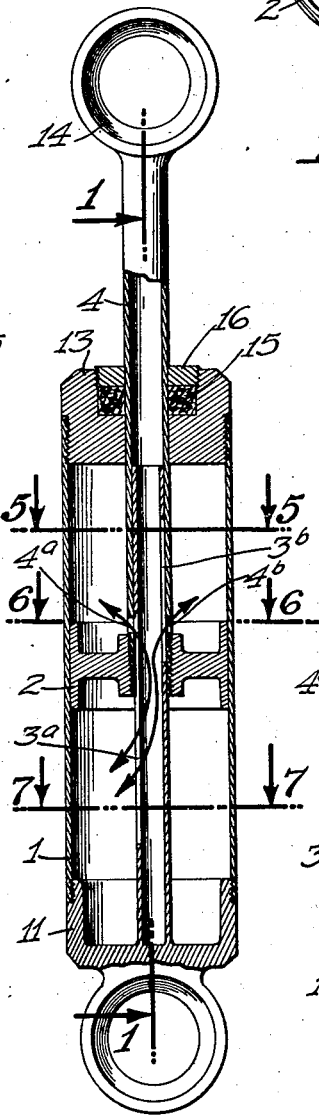
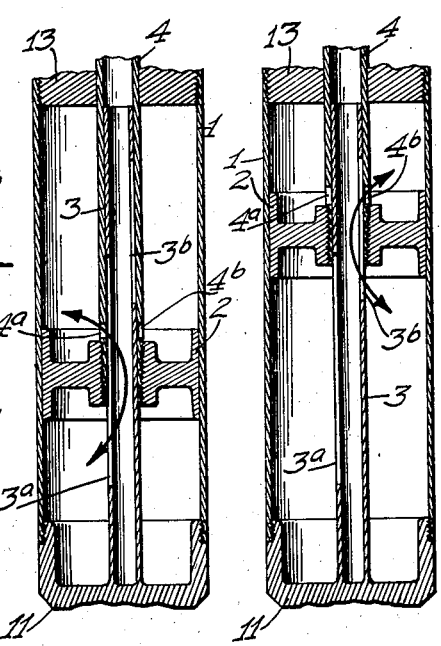
INVENTOR.
LYMAN H. KYLE.
BY
ATTORNEY Patented May 27, 1941

2,243,280

UNITED STATES PATENT OFFICE 2,243,280

HYDRAULIC SHOCK ABSORBER

Lyman H. Kyle, Alhambra, Calif.

Application April 9, 1940, Serial No. 328,716

6 Claims. (Cl. 188—88)

My invention relates to a hydraulic shock absorber particularly adapted for taking up or absorbing the rebound, recoil, or short vertical oscillations of a vehicle.

One of the principal objects of this invention is to provide a hydraulic shock absorber of this class which is particularly simple and economical of construction, but which partakes of all of the advantages of this type of shock absorber, and one which may be readily installed on a vehicle to supplement the conventional vehicle springs.

An important object also of this invention is to provide a hydraulic shock absorber in which the compressed liquid, under the load of the vehicle, is transferred directly from or between the compartments at the opposite sides of the operating piston, which is reciprocated by the up and down movement of the vehicle.

Another important object of this invention is to provide a hydraulic shock absorber of this class in which the liquid is most freely transferred from one compartment to the other at the intermediate or normal position of the piston so that the shock absorber produces least resistance to the up and down movement of the vehicle while in its normal position.

A further important object of this invention is to provide a hydraulic shock absorber of this class in which the liquid passage connecting the different compartments is increasingly restricted as the cylinder and piston are operated beyond the normal position.

With these and other objects in view, as will appear hereinafter, I have devised a hydraulic shock absorber for carrying out the foregoing objects, as will be hereinafter described in detail and particularly set forth further in the appended claims, reference being had to the accompanying drawing, and to the characters of reference thereon, which form a part of this application, in which:

Fig. 1 is a longitudinal sectional view of my shock absorber in its preferred form of construction, taken through 1—1 of Fig. 2;

Fig. 2 is a similar longitudinal sectional view thereof, but taken at right angles thereto, on the line 2—2 of Fig. 1;

Figs. 3 and 4 are fragmentary longitudinal sectional views thereof, similar to that shown in Fig. 2, but showing respectively the piston in slightly depressed and slightly withdrawn positions; and, Figs. 5, 6, and 7 are transverse sections taken respectively at 5—5, 6—6, and 7—7 of Fig. 2.

My hydraulic shock absorber, in a preferred form, as shown in the drawing, consists of a cylinder 1, a piston 2, a hollow tube 3 rigidly mounted on the cylinder, and a hollow connecting rod 4, for the piston, slidably mounted around the tube 3.

The cylinder, which consists preferably of a large cylindrical tube, is secured at its lower end to a head member 11, by means of which the hydraulic shock absorber is pivotally connected, at its lower end, to a suitable moving element of the vehicle, such as the axle or other movable member 12. The hollow tube 3, which may be approximately one-fifth ($\frac{1}{5}$) of the diameter of the cylinder, is secured at its lower end to the head member 11 and extends axially toward the upper end of the cylinder. At the upper end of the cylinder is secured another head member 13, which is provided with an axial bore 13ᵃ.

The piston 2 is reciprocally mounted within the cylinder, and is adapted to reciprocate therein between the head members, though prevented from engagement therewith by fluid pressure within the cylinder. The rod 4 is secured to and extends upwardly from the piston and through the axial bore 13ᵃ of the head member 13. The upper end of the rod may be pivotally connected, by means of a fitting 14, to a stationary portion of the vehicle, such as the frame. The rod 4 is slidably fitted around the tube 3.

The sliding joint between the connecting rod 4 and the head member 13, is sealed by a suitable packing 15, held in position by a nut 16.

It will be noted that the upper end of the tube 3 extends to approximately the lower end of the upper head member, as shown.

The tube is provided with a pair of passage means consisting, in this instance, of a pair of longitudinal slots 3ᵃ and 3ᵇ, the former extending downwardly and the latter extending upwardly from the median portion of the rod. These slots are arranged preferably at the diametrically opposite sides of the tube, and their inner ends overlap each other, as shown. The rod 4 is provided at its diametrically opposite sides with ports 4ᵃ and 4ᵇ which are positioned substantially in alignment with and are adapted to register respectively with the slots 3ᵃ and 3ᵇ. These ports are positioned immediately above the piston and they are also preferably wider than the slots so that they will present the full width opening to the slots even though the rod is turned axially.

When in the normal position, as shown in Figs. 1 and 2, the port 4ᵃ registers with the upper end of the slot 3ᵃ while the port 4ᵇ registers with the lower portion of the slot 3b, but above the lower end of the latter. A normal load on the vehicle will cause the piston, and the ports in the rod, to be moved downwardly a short distance. The ports and slots are so arranged that even with such normal lower position, the two ports register with the respective slots. My shock absorber is designed to be used with the conventional vehicle spring (not shown), and the cylinder and piston of the shock absorber are yieldably held in the above positions by said vehicle spring.

Such intermediate or normal positions of the piston permits relatively free flow of the liquid in the device between the chambers above and below the piston.

As the vehicle springs are compressed, that is, as the piston 2 is forced downwardly, as shown in Fig. 3, the port 4b is moved below the lower end of the slot 3b, restricting the flow of the liquid from or to the opposite ends of the piston through only the port 4a and the lower slot 3a. Thus, the passage to the transfer of liquid is restricted, increasing the resistance to the downward movement of the piston, over and above the relatively free flow of the liquid when the piston is in its intermediate or neutral position.

As the vehicle springs are operated and the piston is moved to a raised position, as shown in Fig. 4, only the port 4b registers with the slot 3b, and again restricting the flow or transfer of the liquid to and from the chambers at the opposite ends of the piston through one port, namely, the port 4b. It will be here noted that the slot 3b is tapered upwardly, namely, from a wide lower end to a narrow upper end, as shown in Fig. 1. Thus, the passage is increasingly restricted, as the piston approaches its upper position.

It will be here noted that after the piston passes beyond or closes the remote ends of the slots 3a and 3b, the compression of the liquid prevents further movement of the piston towards the ends of the cylinder.

Though I have shown and described a particular construction, combination, and arrangement of parts and portions, I do not wish to be limited to the same, but desire to include in the scope of my invention the construction, combination, and arrangement substantially as set forth in the appended claims.

I claim:

1. In a hydraulic shock absorber, a cylinder having therein a hollow tube secured at one end within the cylinder and extending freely towards the opposite end, and a piston reciprocally mounted in the cylinder and provided with a hollow connecting rod slidably mounted around the tube and extending with one end beyond the free end of the tube and beyond the coincident end of the cylinder, the tube having a pair of longitudinally arranged passage means circumferentially spaced from each other, each extending in opposite directions from the median portion of the tube, said passage means overlapping each other, with respect to their longitudinal extent, at said median portion, the rod having a pair of ports adjacent the piston, each being in alignment with an adapted to register with one of the passage means.

2. In a hydraulic shock absorber, a cylinder having a closed lower head and an axial hollow tube secured to and extending upwardly from the head, and a piston reciprocally mounted in the cylinder and provided with a hollow connecting rod slidably mounted around the tube and extending with its upper end above the cylinder, the tube having a pair of longitudinal slots circumferentially spaced from each other, one extending above and the other below the median portion of the tube, said slots overlapping each other, with respect to their longitudinal extent, at said median portion, the rod having a pair of ports immediately above the piston, said ports being wider than the slots and in substantial alignment with and adapted to register with a slot.

3. In a hydraulic shock absorber, a cylinder having therein a hollow rod, and a piston reciprocally mounted in the cylinder and provided with a hollow connecting rod slidable around the first rod, one of the rods having longitudinally arranged passage means circumferentially spaced from each other, each extending in opposite directions from the median portion of the rod, the other rod having a pair of ports, each being in alignment with and adapted to register with one of the passage means, the passage means and ports being so arranged that both ports register simultaneously with their respective passage means continuously during limited longitudinal relative movement of the cylinder and piston at the movable middle portion of the latter.

4. In a hydraulic shock absorber, a cylinder having therein a hollow tube secured at one end within the cylinder and extending freely towards the opposite end, and a piston reciprocally mounted in the cylinder and provided with a hollow connecting rod slidably mounted around the tube and extending with one end beyond the free end of the tube and beyond the coincident end of the cylinder, the tube having a pair of longitudinally arranged passage means circumferentially spaced from each other, each extending in opposite directions from the median portion of the tube, the rod having a pair of ports adjacent the piston, each being in alignment with and adapted to register with one of the passage means, the passage means and ports being so arranged that both ports register simultaneously with their respective passage means continuously during limited longitudinal relative movement of the cylinder and piston at the movable middle portion of the latter.

5. In a hydraulic shock absorber, a cylinder having therein a hollow tube secured at one end within the cylinder and extending freely towards the opposite end, and a piston reciprocally mounted in the cylinder and provided with a hollow connecting rod slidably mounted around the tube and extending with one end beyond the free end of the tube and beyond the coincident end of the cylinder, the tube having a pair of longitudinally arranged passage means circumferentially spaced from each other, each extending in opposite directions from the median portion of the tube, the rod having a pair of ports adjacent the piston, one of the ports adapted to register with one of the passage means and the other port adapted to register with the other passage means, both ports being adapted to register with their respective passage means when the piston is substantially in its median position for inter-connecting the chambers through both ports and one of the passage means, one port and its cooperating passage means inter-connecting the chambers when the piston is beyond its median position in one direction and the other port and its corresponding passage means inter-connecting the chambers when the piston is beyond its median position in the other direction.

6. In a hydraulic shock absorber, a cylinder having a closed lower head and an axially hollow tube secured to and extending upwardly from the head, a piston reciprocally mounted in the cylinder and provided with a hollow connecting rod slidably mounted around the tube and extending with its upper end above the cylinder, the tube having a pair of longitudinal slots circumferentially spaced from each other, one extending above and the other below the median portion of the tube, the rod having a pair of ports positioned above the piston, one of the ports adapted to register with one of the slots and the other port adapted to register with the other slot, both ports being adapted to register with their respective slots when the piston is substantially in its median position for connecting the chamber above the piston through both ports with the chamber below the piston through one slot, one port and its cooperating slot inter-connecting the chambers when the piston is beyond its median position in one direction, and the other port and its corresponding slot inter-connecting the chambers when the piston is beyond its median position in the other direction.

LYMAN H. KYLE.